United States Patent
Howell et al.

(10) Patent No.: US 9,969,378 B2
(45) Date of Patent: May 15, 2018

(54) DETERMINING INTEGRITY OF BRAKING CONTROL SYSTEM

(71) Applicant: AIRBUS OPERATIONS LIMITED, Bristol (GB)

(72) Inventors: George Howell, Bristol (GB); Matthieu Della Nave, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days. days.

(21) Appl. No.: 14/802,776

(22) Filed: Jul. 17, 2015

(65) Prior Publication Data

US 2016/0016576 A1 Jan. 21, 2016

(30) Foreign Application Priority Data

Jul. 18, 2014 (GB) .................................. 1412798.9

(51) Int. Cl.
| | |
|---|---|
| *B60T 17/22* | (2006.01) |
| *B60T 8/17* | (2006.01) |
| *B60T 8/32* | (2006.01) |

(52) U.S. Cl.
CPC .......... *B60T 17/221* (2013.01); *B60T 8/1703* (2013.01); *B60T 8/325* (2013.01)

(58) Field of Classification Search
CPC ....... B60T 17/221; B60T 8/1703; B60T 8/325
See application file for complete search history.

(56) References Cited

U.S. PATENT DOCUMENTS

| | | | |
|---|---|---|---|
| 3,662,333 A | 5/1972 | Howard et al. | |
| 4,792,192 A | 12/1988 | Tveitane | |
| 4,834,465 A | 5/1989 | Guichard et al. | |
| 4,870,390 A * | 9/1989 | Hosoda | B60T 17/22 340/453 |
| 5,397,173 A | 3/1995 | Bourguet | |
| 6,513,885 B1 | 2/2003 | Salamat et al. | |
| 8,661,875 B2 | 3/2014 | Zhou | |
| 2004/0025941 A1* | 2/2004 | Wuerth | B60T 8/326 137/487.5 |
| 2005/0057895 A1 | 3/2005 | Chen et al. | |
| 2006/0017319 A1 | 1/2006 | Kohl et al. | |
| 2008/0157590 A1 | 7/2008 | Godo | |
| 2009/0091180 A1* | 4/2009 | Iwasaki | B60T 8/171 303/11 |

(Continued)

FOREIGN PATENT DOCUMENTS

| | | |
|---|---|---|
| GB | 2470251 A | 11/2010 |
| WO | 2004022402 A1 | 3/2004 |
| WO | 2013142541 A2 | 9/2013 |

OTHER PUBLICATIONS

European Search Report dated Nov. 17, 2015 issued in EP Application No. 15176913.

*Primary Examiner* — Mussa A Shaawat
*Assistant Examiner* — Michael V Kerrigan
(74) *Attorney, Agent, or Firm* — Hauptman Ham, LLP

(57) ABSTRACT

A method of determining the integrity of an electric or hydraulic braking control system. A reduction rate of a voltage or hydraulic pressure in the braking control system is determined, and the integrity of the braking control system is determined by comparing the reduction rate with a threshold. The braking control system may be an aircraft braking control system, and the method may be performed during flight of the aircraft—typically during cruise.

17 Claims, 3 Drawing Sheets

(56) References Cited

U.S. PATENT DOCUMENTS

2010/0090058 A1     4/2010   Cahill et al.
2010/0292889 A1*   11/2010   Cahill .................. B60T 8/1703
                                                                          701/29.1

\* cited by examiner

DETERMINING INTEGRITY OF BRAKING CONTROL SYSTEM

RELATED APPLICATIONS

The present application claims priority from Great Britain Application Number 1412798.9, filed Jul. 18, 2014, the disclosure of which is hereby incorporated by reference herein in its entirety.

FIELD OF THE INVENTION

The present invention relates to a method of determining the integrity of an electric or hydraulic energy storage device of a braking control system. Preferably, but not exclusively, the braking control system is an aircraft braking control system.

BACKGROUND OF THE INVENTION

A hydraulic braking control system of an aircraft is described in U.S. Pat. No. 4,834,465A. The system includes an emergency circuit including a hydraulic accumulator. A pressure sensor of the emergency circuit triggers an alarm when the pressure in the emergency circuit is too low.

SUMMARY OF THE INVENTION

A first aspect of the invention provides a method of determining the integrity of an electric or hydraulic braking control system comprising an energy storage device, the method comprising: determining a reduction rate of a voltage or hydraulic pressure in the braking control system caused by a discharge of the energy storage device; and determining the integrity of the braking control system in accordance with the reduction rate.

The invention can be contrasted with the process in U.S. Pat. No. 4,834,465 which only checks whether an absolute pressure value is too low. Such a low pressure value may be caused by an abnormal loss of integrity of the braking control system, but it may also be caused by a normal leakage of hydraulic liquid. Thus the absolute pressure check of U.S. Pat. No. 4,834,465 cannot be used to reliably check the integrity of the system.

The reduction rate may be determined directly by measuring a voltage change $\Delta V$ or a pressure change $\Delta P$ over a measured time period $\Delta T$, and calculating the reduction rate $\Delta V/\Delta T$ or $\Delta P/\Delta T$ over that measured time period. Alternatively the reduction rate may be determined indirectly by measuring a time period $\Delta T$ over which there is known reduction in voltage or pressure. For instance, in an embodiment of the invention the braking control system comprises an energy storage device such as an accumulator or battery which is repeatedly charged in response to the voltage or hydraulic pressure in the braking control system dropping below an acceptable threshold, and the reduction rate is inferred by a duration between adjacent repeats of the charging of the energy storage device.

The integrity of the braking control system may be determined by comparing the reduction rate with a threshold, by comparing the reduction rate with a reduction rate of another energy storage device, or by any other suitable method.

Typically the energy storage device has an output line, and the reduction rate of a voltage or hydraulic pressure in the braking control system is a reduction rate of a voltage or hydraulic pressure in the output line of the energy storage device.

The braking control system may be an aircraft braking control system, or a braking control system for any other type of vehicle.

The method may be performed when the aircraft is on the ground, or more preferably during flight of the aircraft—typically during cruise. Optionally the method further comprising determining that the aircraft is in cruise, and determining the integrity of the braking control system in response to a determination that the aircraft is in cruise.

Optionally the method further comprises supplying voltage or hydraulic pressure to a brake with a primary energy source, and isolating the energy storage device from the brake (for instance by operating a valve or switch) so that the voltage or hydraulic pressure is supplied to the brake by the primary energy source and not by the energy storage device. This provides redundancy which is particularly preferred in the case of an aircraft braking system. Alternatively, voltage or hydraulic pressure may be supplied to the brake by the primary energy source simultaneously with the energy storage device but this is less preferred particularly in the case of an aircraft braking system.

Typically the method comprises coupling a primary energy source to a brake, and decoupling the energy storage device from the brake (for instance by operating a valve or switch), wherein the discharge of the energy storage device occurs at a time that the energy storage device is decoupled from the brake.

In one embodiment the energy storage device is a hydraulic accumulator, and the method further comprises supplying hydraulic pressure to the brake with a pump, and isolating the hydraulic accumulator from the brake with an accumulator selector valve so that the hydraulic pressure is supplied to the brake by the pump and not by the hydraulic accumulator. Optionally, in the event of failure of the pump, or if the pump is unavailable for some other reason, then the hydraulic pressure is supplied to the brake by the hydraulic accumulator via the accumulator selector valve.

Optionally the method further comprises supplying voltage or hydraulic pressure to a brake with a primary energy source; and when a fault is detected, decoupling the primary energy source from the brake and coupling the energy storage device to the brake.

Typically the energy storage device has an output line for supplying voltage or hydraulic pressure to a brake, and the reduction rate is determined by taking measurements of voltage or hydraulic pressure from the output line.

Optionally the storage device comprises a hydraulic accumulator with a fluid separating device, hydraulic liquid on one side of the fluid separating device, and compressed gas on the other side of the fluid separating device, wherein the hydraulic accumulator has an output line containing hydraulic fluid and the reduction rate is determined by taking measurements of hydraulic pressure from the output line.

A second aspect of the invention provides a controller configured to determine the integrity of an electric or hydraulic braking control system by the method of the first aspect of the invention. The controller is configured to determine the integrity of the braking control system by determining a reduction rate of a voltage or hydraulic pressure in the braking control system caused by a discharge of the energy storage device; and determining the integrity of the braking control system in accordance with the reduction rate.

A third aspect of the invention provides a braking system comprising a brake; an electric or hydraulic braking control system arranged to control the brake, the braking control system comprising an energy storage device; and a controller according to the second aspect of the invention configured to determine the integrity of the electric or hydraulic braking control system.

Typically the braking system is an aircraft braking system, and the brake is an aircraft brake.

Typically the braking system further comprises a primary energy source for supplying voltage or hydraulic pressure to the brake, and means (such as a valve or switch) for isolating the energy storage device from the brake so that the voltage or hydraulic pressure is supplied to the brake by the primary energy source and not by the energy storage device.

Typically the braking system further comprises a primary energy source for supplying voltage or hydraulic pressure to the brake; a first valve or switch which can be selectively activated to couple the primary energy source to the brake and deactivated to decouple the primary energy source from the brake; and a second valve or switch which can be selectively activated to couple the energy storage device to the brake and deactivated to decouple the energy storage device from the brake.

In one embodiment the energy storage device is a hydraulic accumulator, and the braking system further comprises a pump for supplying hydraulic pressure to the brake, and an accumulator selector valve for isolating the hydraulic accumulator from the brake so that the hydraulic pressure is supplied to the brake by the pump and not by the hydraulic accumulator. Optionally the braking system further comprises a normal selector valve which can be deactivated to decouple the pump from the brake, wherein the accumulator selector valve can be activated to couple the hydraulic accumulator to the brake when the pump is decoupled from the brake by the normal selector valve.

Typically the energy storage device has an output line arranged to supply voltage or hydraulic pressure to the brake, and the controller comprises a sensor arranged to take measurements of voltage or hydraulic pressure from the output line.

In the case of a hydraulic energy storage device, then typically the energy storage device comprises a hydraulic accumulator with a fluid separating device, hydraulic liquid on one side of the fluid separating device, and compressed gas on the other side of the fluid separating device, wherein the hydraulic accumulator has an output line containing hydraulic fluid, and the controller comprises a sensor arranged to take measurements of hydraulic pressure from the output line.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
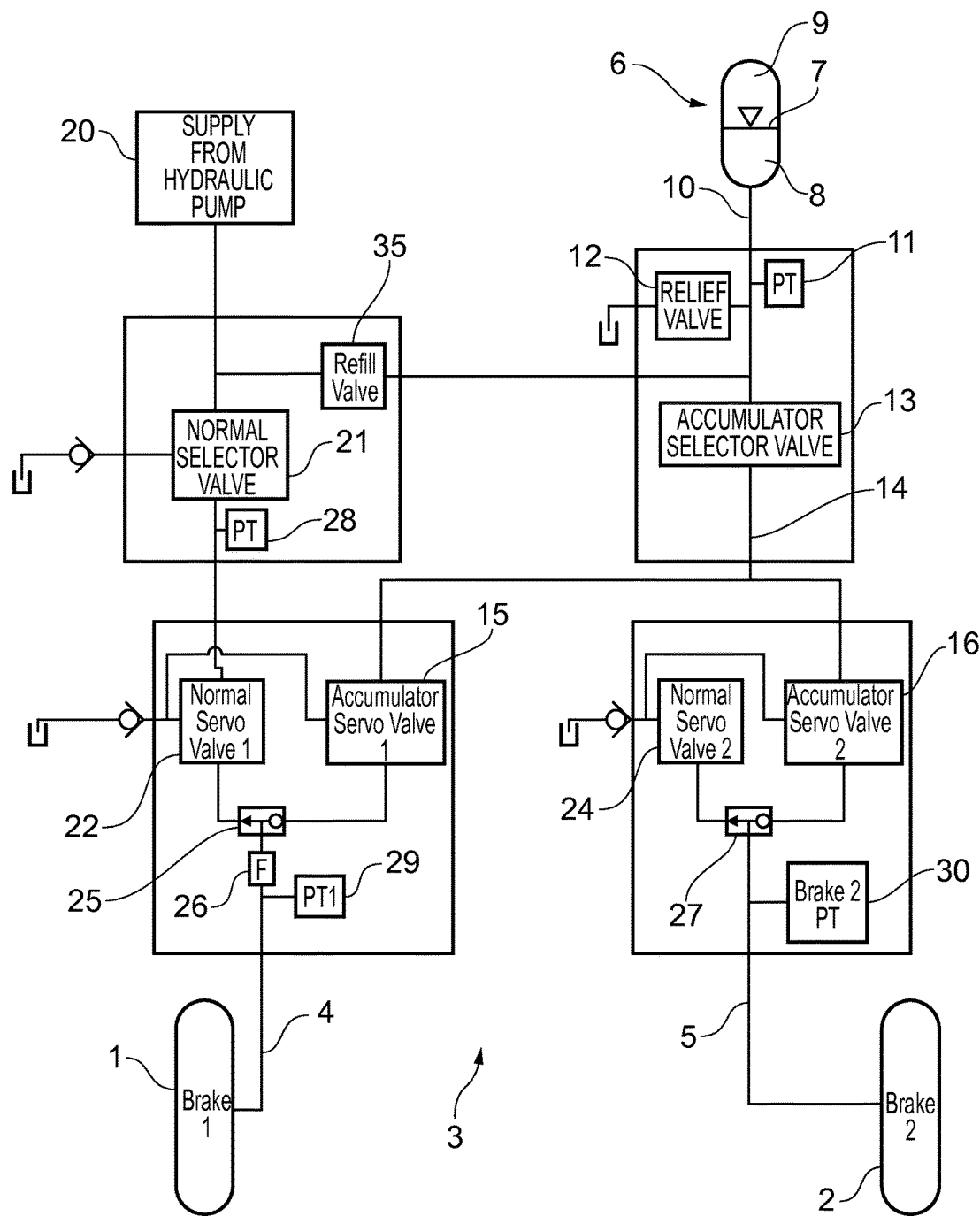
FIG. 1 shows an aircraft braking system.

FIG. 1 shows an aircraft braking system comprising a pair of brakes 1, 2; and a braking control system 3 for applying hydraulic pressure to the brakes on brake lines 4, 5.

The hydraulic accumulator 6 comprises a piston 7 (although the piston 7 could be replaced by a bladder, diaphragm or other fluid separating device) with hydraulic liquid 8 on one side and compressed gas 9 on the other side. The accumulator has an output line 10 with a pressure sensor 11. If the pressure on the output line 10 exceeds a threshold, then a relief valve 12 opens so excess liquid is fed into a reservoir. Further pressure sensors 28-30 are also provided for sensing the pressure at various other parts of the hydraulic system.

The output line 10 leads to an accumulator selector valve 13. When the valve 13 is open the accumulator output line 10 is in fluid communication with a line 14 which splits and leads to a pair of accumulator servo valves 15, 16.

During normal operation, hydraulic pressure on the brake lines 4, 5 is supplied by the hydraulic pump 20. The brake line 4 is supplied via a normal selector valve 21, a normal servo valve 22, a shuttle valve 25, and a filter 26. The brake line 5 is supplied by the pump 20 via a second normal selector valve 23 (shown in FIG. 2 but omitted from FIG. 1 for purposes of clarity), a normal servo valve 24, and a shuttle valve 27. The shuttle valves 25, 27 automatically select the input with the higher pressure.

In the event of failure of the pump 20, or if the pump 20 is unavailable for some other reason, the hydraulic pressure on the brake lines 4, 5 is supplied by the accumulator 6 via the accumulator selector valve 13, the accumulator servo valves 15, 16, and the valves 25, 27.

The pump 20 is used as a primary energy source, and the hydraulic accumulator 6 is used as a secondary energy source and energy storage device. The normal selector valves 21, 23 can be selectively activated to couple the pump 20 to the brakes and deactivated to decouple the pump 20 from the brakes. The accumulator selector valve 13 can be selectively activated to couple the accumulator 6 to the brakes and deactivated to decouple the accumulator 6 from the brakes.

During normal operation, the accumulator 6 is isolated from the brakes 1,2 by the accumulator selector valve 23 so that the hydraulic pressure is supplied to the brakes 1, 2 by the pump 20 and not by the accumulator 6. In the event of failure of the pump 20, or if the pump 20 is unavailable for some other reason, then the pump 20 is isolated from the brakes 1,2 by deactivating the normal selector valve 23 and activating the accumulator selector valve 23 so that the hydraulic pressure is supplied to the brakes 1, 2 by the accumulator 6 and not by the pump 20. Therefore the primary and secondary energy sources are not simultaneously coupled to the brakes 1, 2. This provides an element of redundancy which is particularly preferred in the case of an aircraft braking system.

Figure 2:
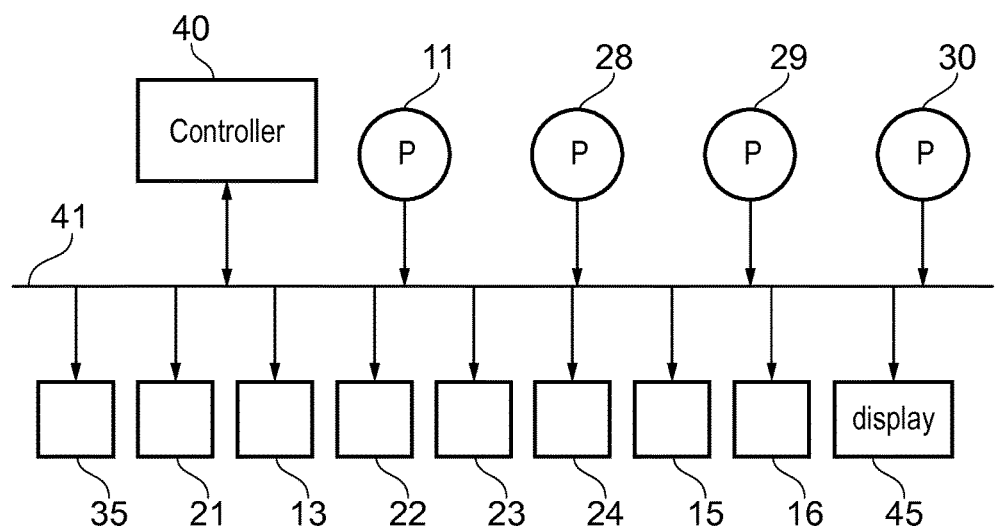
FIG. 2 is a schematic diagram showing an electrical control system for controlling the hydraulic system of FIG. 1.

FIG. 2 is a schematic diagram showing an electrical control system for controlling the hydraulic system of FIG. 1. An avionics computer controller 40 is connected to the various valves and sensors by a bus 41. During normal operation the controller 40 operates the normal selector valves 21, 23 so that hydraulic pressure is maintained by the pump 20, and the accumulator 6 is isolated from the brakes by the accumulator selector valve 13.

In the example of FIG. 2 the controller 40 communicates with the valves via a bus 41, but in an alternative embodiment it can be connected to each valve via a discrete wire.

When braking is required, then the controller 40 issues braking commands to the normal servo valves 22, 24 which increase the pressure on the brake lines 4, 5 in accordance with these braking commands.

When a fault is detected (for instance by a drop in pressure at the sensor 28) then the normal selector valves 21, 23 are deactivated by the controller 40 to decouple the pump 20 from the brakes, and the accumulator selector valve 13 is activated by the controller 40 to couple the accumulator 6 to the brakes. When braking is required then the controller 40 issues braking commands to the accumulator servo valves 15, 16 which increase the pressure on the brake lines 4, 5 in accordance with these braking commands. As the accumulator servo valves 15, 16 increase the pressure, the piston 7 of the accumulator is pushed down by the compressed gas 9 to feed hydraulic liquid into the output line 10 and maintain the system pressure.

During cruise of the aircraft there is a natural leakage of hydraulic liquid from the accumulator 6 and other parts of the hydraulic system (such as the relief valve 12). The controller 40 automatically determines that the aircraft is in cruise when the airspeed is high and the aircraft landing gear is retracted. When the controller 40 determines that the aircraft is in cruise, it continuously monitors the pressure from sensor 11. When the monitored pressure drops below an acceptable threshold, then the controller 40 issues a refill command to a refill valve 35 which opens in response to the refill command to recharge the accumulator 6 with liquid.

Opening the refill valve 35 causes the accumulator 6 to be charged by the pump 20. During this charging process the accumulator selector valve 13 is deactivated (closed) so the accumulator 6 is decoupled from the brakes. The normal selector valves 21, 23 may be open or closed during the charging process.

When the pump 20 has charged the accumulator 6 to the required pressure, then the controller 40 commands the refill valve 35 to close. Closing the refill valve 35 isolates the pump 20 from the accumulator, so the accumulator 6 starts to gradually discharge even though the accumulator selector valve 13 remains deactivated (closed) so the accumulator 6 is decoupled from the brakes.

Figure 3:
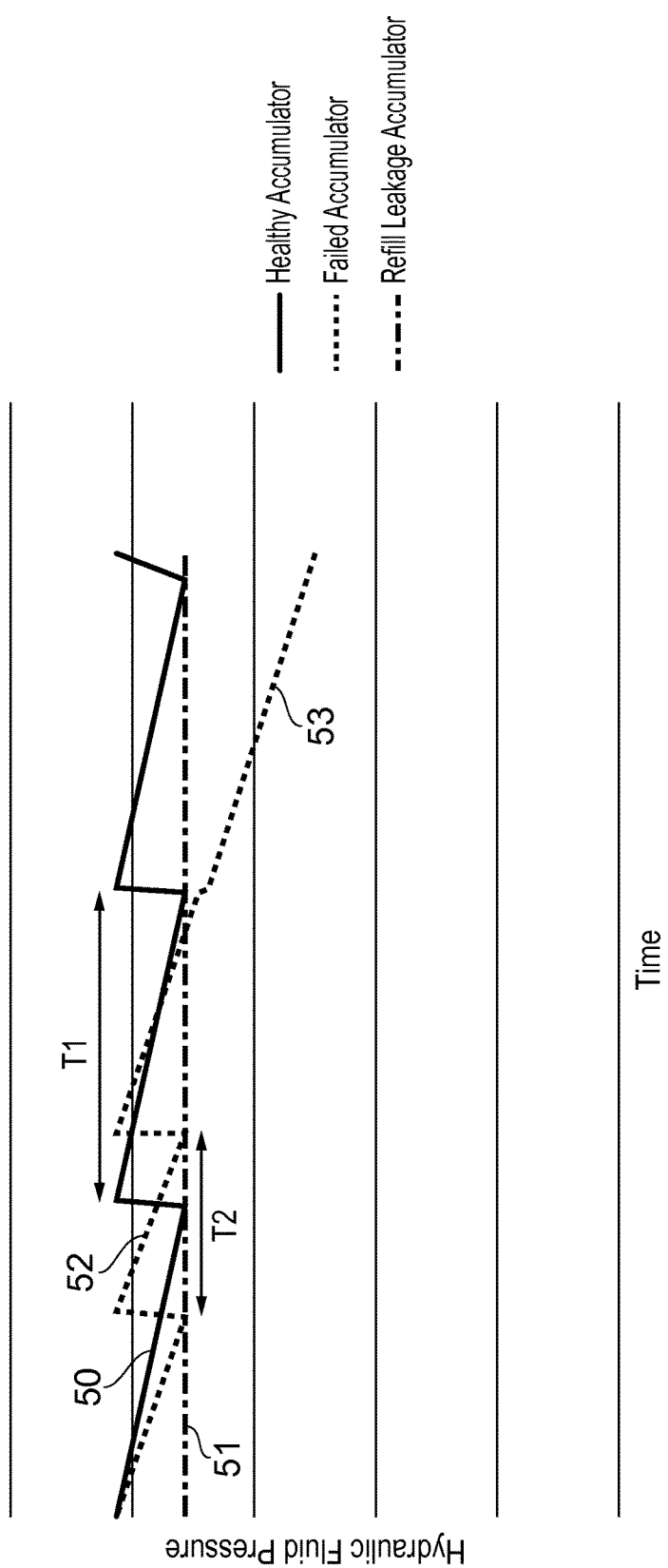
FIG. 3 is a graph showing a variation in pressure as the accumulator leaks and is then automatically refilled.

FIG. 3 is a graph showing at 50 the variation in pressure as the accumulator delivers hydraulic fluid into the system and is then automatically recharged in response to the hydraulic pressure dropping below an acceptable threshold 51. If the accumulator 6 is healthy, then there is a relatively slow reduction rate of pressure dP/dT and the duration T1 between adjacent refill commands is relatively long. If there is a liquid or gas leak in the accumulator 6 or another part of the hydraulic system, then the reduction rate dP/dT is greater as indicated at 52, giving a reduced duration T2 between adjacent repeats. Alternatively if there is a complete loss of gas in the accumulator (due to a very large leak on the gas side) then a small liquid leak will cause an extremely rapid decrease in pressure.

The controller 40 monitors the duration T1, T2 between adjacent refill commands, and if the duration falls below a threshold then it concludes that there is a leak. When the controller 40 concludes that there is a leak then it takes two actions: firstly it outputs a warning via display device 45, and secondly it disables the refill function so there are no further refills of the accumulator. For this reason the pressure drops away as indicated at 53 in FIG. 3 after the leak has been detected in the previous refill cycle.

Monitoring the duration T1, T2 is a simple way of inferring the reduction rate dP/dT without having to analyse large numbers of pressure measurements, but it does delay detection of leak until the next time that the accumulator is recharged.

Alternatively the controller 40 can determine the reduction rate dP/dT more frequently by checking the time between passing predetermined thresholds: for example t(0)=180 bar, t(1)=160 bar, t(2)=150 bar etc. If [tn−t(n−1)] <T then the controller 40 infers that the accumulator has failed. This method can be used in a system which does not automatically refill the accumulator during cruise.

Alternatively the reduction rate dP/dT could be directly and continuously monitored by the controller 40 and compared with a threshold, enabling a leak to be detected immediately.

In the examples given above the reduction rate dP/dT is compared with a fixed and predetermined threshold. In an alternative embodiment of the invention the braking control system has two accumulators—one for the front brakes and one for the aft brakes—and the state of health of the accumulators is determined by comparing their respective reduction rates with each other, rather than comparing them to a fixed and predetermined threshold. So for example if the reduction rate of one of the accumulators exceeds the reduction rate of the other accumulator by some fixed amount or percentage, then the controller 40 concludes that the accumulator with the higher reduction rate is faulty.

The method described above has various advantages. Firstly, the method can be performed automatically without requiring the attention of airline maintenance personnel. This enables the method to be performed during flight of the aircraft and to provide an early warning system for the pilot and crew. Another advantage is that a gas pressure sensor on the gas side of the accumulator is not required in order to test its integrity. Rather the method can use a pre-existing sensor on the liquid side of the accumulator, resulting in a reduced weight. It also removes the possibility of a loss of gas via such a gas pressure sensor. Another advantage is that the accurate and reliable nature of the integrity test means that the accumulator need not be oversized, resulting in a reduced weight of the accumulator.

In the hydraulic braking system described above, the primary energy source is a pump 20, and a hydraulic accumulator 6 is used as a secondary energy source. In an alternative embodiment of the invention, the braking system may be an electric braking system in which the primary energy source is an electric generator, and an electric battery is used as a secondary energy source. The method described above with reference to FIG. 3 can be used in such a system, substituting electric charge for liquid volume, and voltage for hydraulic pressure.

Figure 4:
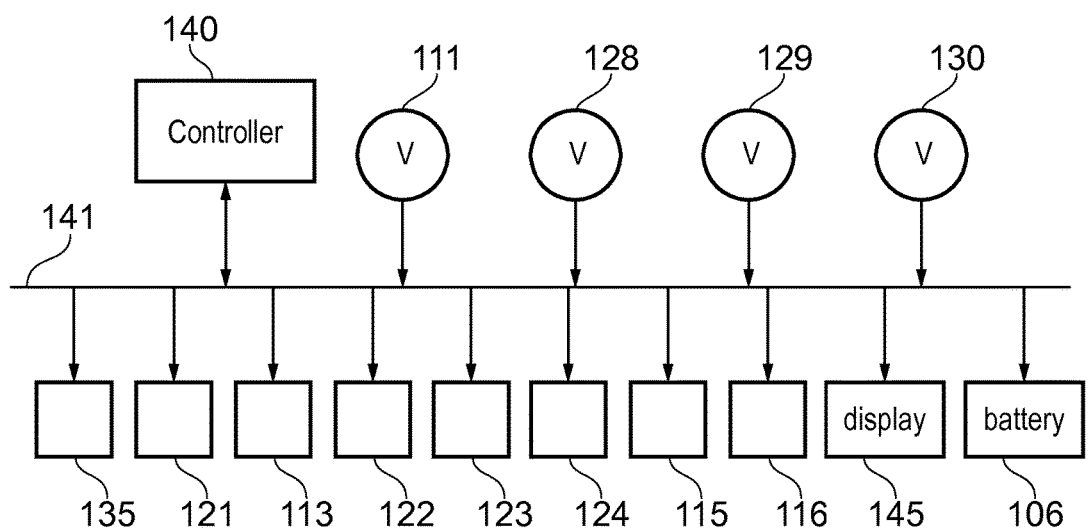
FIG. 4 is a schematic diagram showing a control system for controlling an electric braking system.

FIG. 4 is a schematic diagram showing the principal components of such an electric braking system, with equivalent components to the system of FIG. 2 indicated by the same reference number incremented by 100. An avionics controller 140 is connected to various switches and voltage sensors via a bus 141. During normal operation, the controller 140 operates the normal selector switches 122, 123 and switches 125, 127 so that power is provided from the generator, and the battery 106 is isolated from the brakes. In the event of failure of the motor, or if the generator is unavailable for some other reason, braking energy is supplied by the battery 106.

During cruise, the controller 140 operates a method similar to the one described above with reference to FIG. 3. That is, it continuously monitors the voltage from the voltage sensor 11 during cruise; charges the battery 106 when the monitored voltage drops below an acceptable threshold; monitors the duration between adjacent charges, and if the duration falls below a threshold then it concludes that there is a fault and outputs a warning via a display device 145.

Although the invention has been described above with reference to one or more preferred embodiments, it will be appreciated that various changes or modifications may be made without departing from the scope of the invention as defined in the appended claims.

The invention claimed is:

1. A method of determining the integrity of an electric braking control system comprising an energy storage device, the method comprising:
   measuring a voltage reduction over a measured period of time;
   determining a reduction rate of a voltage in the braking control system based on the measured voltage over the measured period of time; and
   determining the integrity of the braking control system in accordance with the reduction rate.

2. The method of claim 1, wherein the braking control system is an aircraft braking control system.

3. The method of claim 2, wherein the method is performed during flight of the aircraft.

4. The method of claim 3 further comprising determining that the aircraft is in cruise, and determining the integrity of the braking control system in response to a determination that the aircraft is in cruise.

5. The method of claim 1, further comprising repeatedly charging the energy storage device in response to the voltage in the braking control system dropping below an acceptable threshold, wherein the reduction rate is determined in accordance with a duration between adjacent repeats of the charging of the energy storage device.

6. The method of claim 1, wherein the energy storage device is an electric battery.

7. The method of claim 1, wherein the energy storage device has an output line, and the reduction rate of a voltage in the braking control system is a reduction rate of a voltage in the output line of the energy storage device.

8. The method of claim 1, wherein the braking control system comprises a primary energy source and a switch, and the method further comprises: opening the switch so that the primary energy source charges the energy storage device, and closing the switch after the primary energy source has charged the energy storage device to isolate the primary energy source from the energy storage device, wherein the discharge of the energy storage device occurs with the switch closed.

9. The method of claim 1, wherein determining the integrity of the braking control system in accordance with the reduction rate comprises comparing the reduction rate with a threshold.

10. The method of claim 1, wherein the method further comprises coupling a primary energy source to a brake, and decoupling the energy storage device from the brake, wherein the discharge of the energy storage device occurs at a time that the energy storage device is decoupled from the brake.

11. The method of claim 1, wherein the method further comprises supplying voltage to a brake with a primary energy source, isolating the energy storage device from the brake so that the voltage is supplied to the brake by the primary energy source and not by the energy storage device, and determining the reduction rate of voltage in the braking control system caused by a discharge of the energy storage device when it is isolated from the brake.

12. The method of claim 1, wherein the method further comprises supplying voltage to a brake with a primary energy source; and detecting a fault in the primary energy source; and decoupling the primary energy source from the brake and coupling the energy storage device to the brake.

13. A controller configured to determine the integrity of an electric braking control system by the method of claim 1.

14. A braking system comprising a brake; an electric or hydraulic braking control system arranged to control the brake, the braking control system comprising an energy storage device; and a controller according to claim 13 configured to determine the integrity of the electric braking control system.

15. The braking system of claim 14, wherein the energy storage device has an output line arranged to supply voltage to the brake, and the controller comprises a sensor arranged to take measurements of voltage from the output line.

16. A method of determining the integrity of an electric or hydraulic aircraft braking control system comprising an energy storage device, the method comprising: measuring a voltage reduction or a pressure reduction over a measured period of time; determining a reduction rate of a voltage or hydraulic pressure in the braking control system based on the measured voltage or pressure reduction over the measured period of time; and determining the integrity of the braking control system in accordance with the reduction rate.

17. The method of claim 16, wherein the reduction rate is a reduction rate of a hydraulic pressure in the braking control system and wherein the energy storage device is a hydraulic accumulator.

* * * * *